E. E. GAMON.
WATER METER.
APPLICATION FILED APR. 15, 1910.

974,256.

Patented Nov. 1, 1910.
2 SHEETS—SHEET 1.

WITNESSES:
O. A. Alliston.
Elsie L. Drury

INVENTOR
Ernest E. Gamon
BY Fredk C. Fischer
ATTORNEY

E. E. GAMON.
WATER METER.
APPLICATION FILED APR. 15, 1910.

974,256.

Patented Nov. 1, 1910.
2 SHEETS—SHEET 2.

WITNESSES:
C. A. Alliston.
Elsie D Jury

INVENTOR
Ernest E. Gamon
BY
Frank C. Fischer.
ATTORNEY

UNITED STATES PATENT OFFICE.

ERNEST E. GAMON, OF NEWARK, NEW JERSEY.

WATER-METER.

974,256. Specification of Letters Patent. Patented Nov. 1, 1910.

Application filed April 15, 1910. Serial No. 555,648.

*To all whom it may concern:*

Be it known that I, ERNEST E. GAMON, a citizen of the United States, residing in the city of Newark, in the county of Essex and State of New Jersey, have invented certain new and useful Improvements in Water-Meters, of which the following is a full, clear, and exact description, such as will enable others skilled in the art to which it appertains to make, construct, and use the same, reference being had to the accompanying drawings, and to letters of reference marked thereon, forming a part of this specification.

This invention relates to that type or class of water meters generally known as the "current or inferential," and has for its particular object, to so construct and mount a single propeller wheel in the outlet chamber of the water meter, that the water in the lower chamber exerts an upward pressure against the propeller wheel, but has no communication with the outlet chamber, while the water in the upper chamber passes through the propeller wheel into the outlet chamber.

The invention consists in a water meter, which comprises a main casing having upper and lower receiving chambers, and an outlet chamber, a cylinder mounted in said outlet chamber, which is provided with upper and lower bearings supporting a spindle, a propeller wheel mounted on the spindle and provided with means which co-act with means on the cylinder, the arrangement being such that the water in the lower casing does not pass through the wheel or outlet chamber, but exerts an upward thrust against the under side of the wheel, while the water from the upper chamber is delivered to the wheel and discharged into the outlet chamber.

Figure 1:
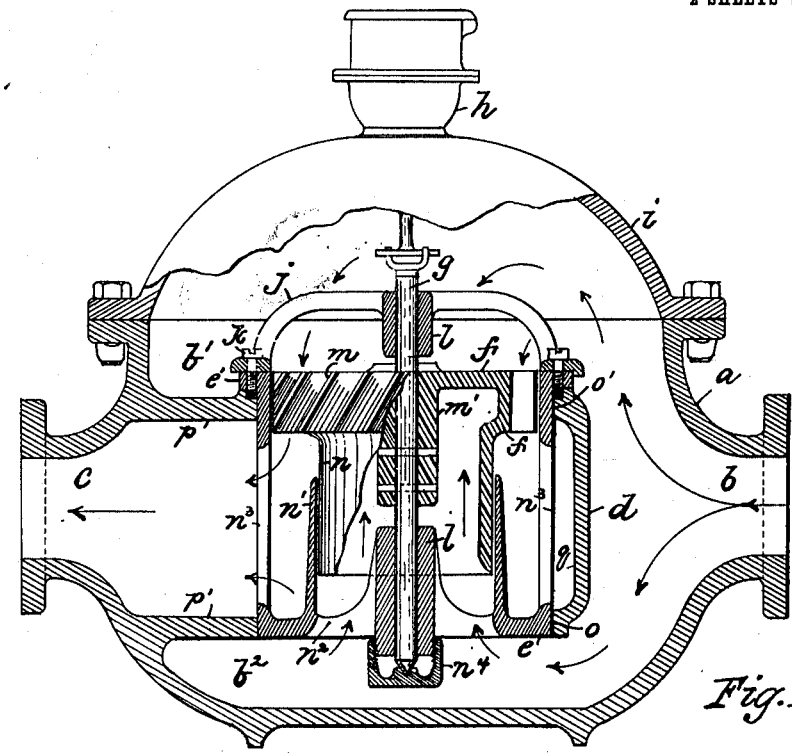
Figure 2:
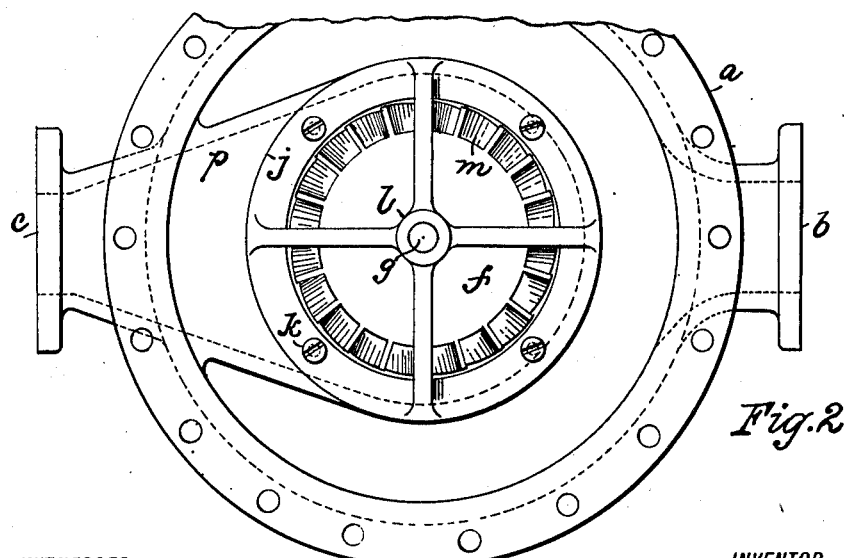
Figure 3:
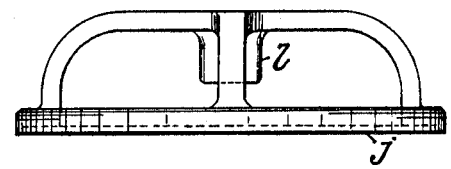
Figure 4:
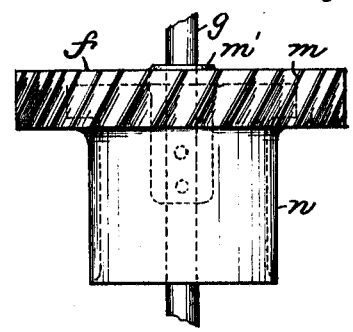
Figure 5:
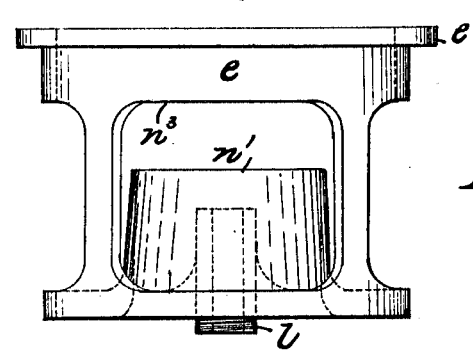
Figure 6:
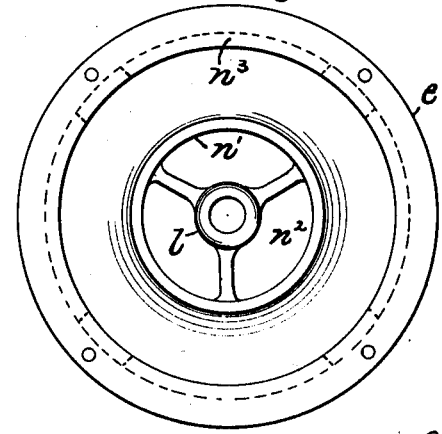

In the accompanying drawings forming a part of this specification, Figure 1 is a vertical longitudinal center section of a meter showing an embodiment of my invention. Fig. 2 is a top plan view, the cover being removed. Fig. 3 is a side elevation of the spider. Fig. 4 is a side elevation of the propeller wheel. Fig. 5 is a side elevation of the cylinder; and Fig. 6 is a plan view of the same.

Similar letters of reference refer to like parts throughout the specification and drawings.

The main or external meter casing $a$ has the usual inlet $b$ and outlet $c$. The inflowing steam from the inlet $b$ is caused to divide and pass up and down to the receiving chambers $b'$ and $b^2$ of the main or external casing $a$, as indicated by the arrows. The outlet $c$ is connected to the annular outlet chamber $d$, in which is mounted the cylinder $e$, and the propeller wheel $f$. The propeller wheel $f$ is fixed to the spindle $g$, which by suitable connections at its upper end, drives a register gear train in the usual manner, the register being inclosed in the housing $h$ secured to the lid $i$. A skeleton frame or spider $j$ mounted upon the cylinder $e$ is secured together with the cylinder to the annular outlet chamber $d$ by suitable connections, such as screws $k$, and the said spider $j$ and cylinder $e$ contain the bearings $l$ for the propeller spindle $g$.

The propeller wheel $f$ is the indicating device employed to indicate the velocity and hence the volume, and consists essentially of a helix or screw whose axis coincides with the flowing stream and which is caused to rotate by the impact or friction of the moving water, as is common in meters of the type generally known as "current" or "inferential" meters, and is provided with helical wings or blades $m$ formed on its periphery through which the water from the top passes, causing the wheel and its attached spindle $g$ and the register train to revolve. The propeller wheel $f$ is provided with a downwardly extending internal bearing $m'$ for the spindle $g$, and also with a downwardly extending tubular extension $n$ co-acting with a tubular extension $n'$ formed on the cylinder $e$. The cylinder $e$ on its under side is provided with a series of openings $n^2$ and a bearing $l$ for the spindle $g$. The weight of the propeller wheel is supported by a suitable bearing $n^4$, the interior of which has screw-threaded engagement with the exterior of the bearing $l$. The periphery of the cylinder $e$ is provided with ports $n^3$ through which the water after passing through the helical wings or blades $m$ of the propeller wheel $f$ passes to the outlet chamber and through the outlet $c$. The cylinder $e$ is mounted, preferably, vertically in a bearing $o$, $o'$ formed in the upper and lower partitions $p$, $p'$, which with the circular end wall $q$ form the outlet chamber $d$. The cylinder $e$ at its upper end is provided with an annular flange $e'$ which rests on the upper partition $p$, and is secured against accidental displacement upwardly by the screws k, which at the same time secure the skeleton frame j to the cylinder e. It will thus be seen that when assembled, the tubular extension n' of the cylinder and the downwardly extending tubular extension n of the propeller wheel, form a receiving chamber, so that the water in the lower casing does not pass through the helical blades of the propeller wheel, but fills up the tubular extension on the under side of the said wheel, as well as the tubular extension on the cylinder, thereby exerting an upward thrust against the under side of the propeller wheel, while the water from the upper chamber is delivered through the helical blades of the propeller wheel to the outlet chamber and through the outlet c. The structure illustrated prevents the steam entering the lower chamber from communicating with the intermediate outlet chamber d or the outlet c.

The present invention provides a very efficient and exceedingly simple water meter, the same being constructed of a minimum number of parts and reduced to the simplest operative efficiency.

I am aware that changes may be made in the several arrangements of the various parts, as well as in the details of construction thereof, without departing from the scope of my present invention, hence, I do not wish to be limited to the exact arrangements and combinations of the parts as herein shown and described, as obvious modifications will suggest themselves to those skilled in the art.

I claim:

1. In a water meter, the combination with a main casing having upper and lower receiving chambers and an intermediate outlet chamber, a propeller wheel mounted in said intermediate chamber, so arranged that the water in the lower chamber exerts an upward pressure against the propeller wheel, but has no communication with the outlet chamber, while the water in the upper chamber passes through the propeller wheel into the outlet chamber.

2. In a water meter, the combination with a main casing having upper and lower receiving chambers and an intermediate outlet chamber, a cylinder mounted in said intermediate outlet chamber provided with openings communicating with said outlet chamber, a propeller wheel mounted in said cylinder, so arranged that the water in the lower chamber exerts an upward pressure against the propeller wheel but has no communication with the outlet chamber, while the water in the upper chamber passes through the propeller wheel into the outlet chamber.

3. In a water meter, the combination with a main casing having upper and lower receiving chambers and an intermediate outlet chamber, a cylinder mounted in said intermediate outlet chamber, a propeller wheel mounted in said cylinder provided with means which co-act with means on said cylinder, so arranged that the water in the lower chamber exerts an upward pressure against the propeller wheel but has no communication with the outlet chamber, while the water in the upper chamber passes through the propeller wheel into the outlet chamber.

4. In a water meter, the combination with a main casing having upper and lower receiving chambers and an intermediate outlet chamber, a cylinder mounted in said intermediate outlet chamber, a propeller wheel mounted in said cylinder provided with centrally depending means so arranged that the water in the lower chamber fills up said depending means and exerts an upward pressure against the under side of the wheel, but has no communication with the outlet chamber, while the water in the upper chamber passes through the propeller wheel into the outlet chamber.

5. In a water meter, the combination with a main casing having upper and lower receiving chambers and an outlet chamber, a cylinder mounted in said outlet chamber and provided with upper and lower bearings, a spindle supported in the bearings, and a propeller wheel provided with a tubular extension mounted on said spindle, the cylinder being provided with a tubular extension co-acting with the tubular extension of the propeller wheel, the arrangement being such that the water in the lower casing exerts an upward thrust against the under side of the propeller wheel, while the water from the upper chamber is delivered to the wheel and discharged into the outlet chamber.

6. In a water meter, the combination with a main casing having upper and lower receiving chambers and an intermediate outlet chamber, said intermediate outlet chamber being open at the top and closed at the bottom, a cylinder mounted in said outlet chamber provided with a bearing, a propeller wheel provided with a tubular extension, said tubular extension engaging with the bearing on the cylinder so as to form a receiving chamber, the arrangement being such that the water in the lower casing enters the receiving chamber and exerts an upward thrust against the under side of the propeller wheel, but has no communication with the outlet chamber, while the water from the upper chamber is delivered to the wheel and discharged into the outlet chamber.

This specification signed and witnessed this 14th day of April, 1910.

ERNEST E. GAMON.

Witnesses:
  FREDK. C. FISCHER,
  C. A. ALLISTON.